(12) United States Patent
Tiger et al.

(10) Patent No.: US 9,667,675 B2
(45) Date of Patent: May 30, 2017

(54) PROXY AND METHOD FOR DETERMINATION OF A UNIQUE USER IDENTIFICATION FOR A PLURALITY OF APPLICATIONS ACCESSING THE WEB FROM A MOBILE DEVICE

(71) Applicant: Onavo Mobile Ltd., Ramat Gan (IL)

(72) Inventors: Roi Tiger, Tel Aviv (IL); Guy Rosen, Givatayim (IL); Yuval Ariav, Benyamina (IL); Eran Fridman, Neve Yarak (IL); Gadi Eliashiv, Tel Aviv (IL)

(73) Assignee: FACEBOOK, INC., Menlo Park, CA (US)

( * ) Notice: Subject to any disclaimer, the term of this patent is extended or adjusted under 35 U.S.C. 154(b) by 587 days.

(21) Appl. No.: 13/731,227

(22) Filed: Dec. 31, 2012

(65) Prior Publication Data
US 2013/0262675 A1 Oct. 3, 2013

Related U.S. Application Data

(60) Provisional application No. 61/618,733, filed on Mar. 31, 2012.

(51) Int. Cl.
| | |
|---|---|
| *H04L 29/06* | (2006.01) |
| *H04W 4/00* | (2009.01) |
| *H04L 29/08* | (2006.01) |
| *H04L 29/12* | (2006.01) |

(52) U.S. Cl.
CPC ............. *H04L 65/40* (2013.01); *H04L 67/02* (2013.01); *H04L 67/28* (2013.01); *H04L 67/289* (2013.01); *H04W 4/003* (2013.01); *H04L 61/2596* (2013.01); *H04L 61/35* (2013.01)

(58) Field of Classification Search
CPC ..... H04L 61/35; H04L 61/2596; H04L 65/40; H04L 67/02; H04L 67/289; H04L 67/28; H04W 4/003
See application file for complete search history.

(56) References Cited

U.S. PATENT DOCUMENTS

| | | | |
|---|---|---|---|
| 7,376,740 B1 | 5/2008 | Porter et al. | |
| 7,908,383 B2 | 3/2011 | Porter et al. | |
| 8,006,283 B2 | 8/2011 | Reiher | |
| 8,099,113 B2 | 1/2012 | Morrison | |
| 8,180,814 B1 * | 5/2012 | Swengler | G06F 17/3012 707/831 |
| 8,279,869 B1 * | 10/2012 | Tran | H04L 69/163 370/401 |
| 2003/0065950 A1 * | 4/2003 | Yarborough | H04L 63/0281 726/4 |
| 2004/0024881 A1 * | 2/2004 | Elving et al. | 709/227 |

(Continued)

*Primary Examiner* — Chris Parry
*Assistant Examiner* — Stephen Houlihan

(57) ABSTRACT

A proxy and a method for providing a unique user identification (UUID) to a mobile device executing a plurality of mobile applications includes receiving a request to access an resource by a mobile application of the plurality of mobile applications; generating a unique user identification (UUID) to uniquely identify the mobile device, thereby the UUID enables the at least one resource to uniquely identify the mobile device regardless of which of the plurality of mobile applications made a request to the resource; associating to the request the UUID; and forwarding the request with the UUID to the resource.

13 Claims, 2 Drawing Sheets

(56) References Cited

U.S. PATENT DOCUMENTS

| | | |
|---|---|---|
| 2005/0097186 A1* | 5/2005 | Redpath .............. H04L 67/2861 709/217 |
| 2005/0182843 A1* | 8/2005 | Reistad ............... H04L 43/0817 709/230 |
| 2007/0174490 A1 | 7/2007 | Choi et al. |
| 2009/0144159 A1* | 6/2009 | Bashyam ........................ 705/14 |
| 2010/0153434 A1 | 6/2010 | Erickson et al. |
| 2010/0251143 A1 | 9/2010 | Thomas et al. |
| 2011/0099612 A1 | 4/2011 | Lee et al. |
| 2012/0003983 A1* | 1/2012 | Sherlock ................. H04L 41/08 455/450 |
| 2012/0054851 A1* | 3/2012 | Piazza ................. H04L 63/0209 726/12 |
| 2012/0220263 A1* | 8/2012 | Smith ................... H04W 4/003 455/410 |
| 2013/0078946 A1* | 3/2013 | Pecen ................. H04L 63/0823 455/411 |

* cited by examiner

PROXY AND METHOD FOR DETERMINATION OF A UNIQUE USER IDENTIFICATION FOR A PLURALITY OF APPLICATIONS ACCESSING THE WEB FROM A MOBILE DEVICE

CROSS-REFERENCE TO RELATED APPLICATIONS

The application claims the benefit of U.S. Provisional application No. 61/618,733 filed Mar. 31, 2012, the contents of which are herein incorporated by reference.

TECHNICAL FIELD

The invention generally relates to applications used to communicate over the Internet from a mobile device, and more specifically to a way of uniquely identifying a user of a mobile device when using different applications on the mobile device.

BACKGROUND

The use of mobile devices such as tablet computers, smart phones, mobile phones, handheld devices, and other devices that provide communication between a mobile device and resources over the Internet, has become commonplace. In the traditional PC environment, a web-browser provides most of the access for a user of the PC to resources on the Internet, potentially with the exception of an e-mail application, such as Outlook® by Microsoft®. Therefore, when it is desired to gather information about a user, the activity of the user can typically be found concentrated in the web-browser, e.g., Explorer®, FireFox®, Mozilla®, Safari®, Chrome™, or others. Each web-browser maintains its own profile of the user, for example by having cookies installed on the browser, and assuming that a typical user uses only a single browser, such information collection typically provides good information about the user.

The challenge begins when entering the world of mobile communications. The mobile devices are characterized by having a plurality of mobile applications, also referred to as "apps", each app having independent communication over the Internet for the user of the mobile device. Therefore, there may be a browser, an e-mail program, Facebook®, Skype®, and the like, each communicating independently for the user of the mobile device. In many cases, each such app is a "mini-browser" of its own that enables communication with a resource on the Internet. As such, a mobile application typically collects proprietary information about the user which is not shared with others. Thus, the user will have separate and unique user identification (UID) for each app used on the device.

It is therefore difficult to provide a coherent view of the user, let alone provide the user with data that is based on a user's profile collected from other apps. Hence, access from, for example, two different apps to the very same Internet resource by the user of the same mobile device would result in two different detached profiles for the same user of the same mobile device on that Internet resource, as two different UIDs are utilized.

It would be therefore advantageous to provide a solution that overcomes the limitations of currently available applications (apps) for mobile devices. It would be further advantageous if such a solution would not require changes to mobile applications that are downloaded to the mobile device.

SUMMARY

Certain embodiments disclosed herein include a proxy for assignment of a unique user identification (UUID) to a mobile device executing a plurality of mobile applications. The proxy comprises a first interface to any of a plurality of Internet resources to which the mobile device is communicatively connected via a network; a second interface to the plurality of mobile applications; a processor connected to the first interface and to the second interface; and a memory connected to the processor and loaded with instructions that when executed by the processor cause association of the UUID of the mobile device to a request sent from one of the plurality of mobile applications to at least one Internet resource of the plurality of Internet resources, wherein the UUID enables the at least one Internet resource to uniquely identify the mobile device regardless of which of the plurality of mobile applications made a request to the Internet resource.

Certain embodiments disclosed herein also include a method for providing a unique user identification (UUID) to a mobile device executing a plurality of mobile applications. The method comprises receiving a request to access an Internet resource by a mobile application of the plurality of mobile applications; generating a unique user identification (UUID) to uniquely identify the mobile device, thereby the UUID enables the at least one Internet resource to uniquely identify the mobile device regardless of which of the plurality of mobile applications made a request to the Internet resource; associating to the request the UUID; and forwarding the request with the UUID to the Internet resource.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1:
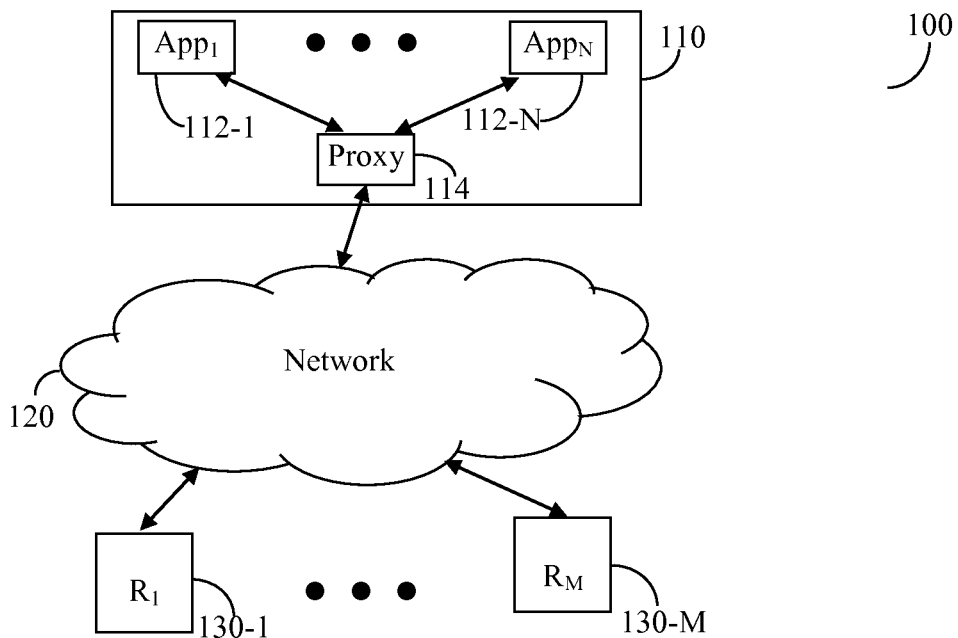
FIG. 1 is a schematic diagram of a system according to one embodiment disclosed herein.

The embodiments disclosed herein are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Unlike the case of a personal computer (PC) web browser, where the web browser provides information with respect of the user of the PC, in a mobile device each application operates independently with respect of internet access. Thus, in the PC environment, applications that operate from the web browser can share cookies provided to the web browser, whereas in the mobile environment, applications are independent and are unable to share the likes of cookies. In order to collect meaningful information to be shared and used by all of the different mobile applications (apps) used on the mobile device, a unique user ID (UUID) is provided, as further discussed in greater detail herein below.

According to various embodiments disclosed herein, the UUID is provided by a proxy, communicatively connected, locally or remotely, to the mobile device. Each communication from an app to a web resource or vice versa is tracked using the UUID. This allows the building of a unique profile to a user regardless of the apps used. For example, a user of a first app may see advertisements on another app that also uses the same UUID.

FIG. 1 depicts an exemplary and non-limiting schematic diagram of a system 100 according to a first embodiment of the invention. A mobile device 110, which may be a smart phone, a mobile phone, a tablet computer, and the like, has installed thereon a plurality of different apps, $APP_1$ 112-1 through $APP_N$ 112-N. The mobile device 110 is communicatively connected to a network 120 which may be a local area network (LAN), a wide area network (WAN), a metro area network (MAN), the Internet, the worldwide web (WWW), a wireless network, a wired network, a cellular network, the like, and any combinations thereof.

In accordance with the instant embodiment, a proxy 114 is installed on the mobile device and all communication from the device to any one of a plurality of Internet resources $R_1$ 130-1 through $R_M$ 130-M that are communicatively connected to the network 120, is performed through the proxy 114. In one embodiment, the proxy 114 is an application installed on the mobile device and executed thereon. An Internet resource $R_1$ 130-1 through $R_M$ 130-M may be, for example, a web server, an application server, a database, or any computing devices with which an app can access and communicate.

The proxy 114 proxies between any one of the Internet resources $R_1$ 130-1 through $R_M$ 130-M and any one of the apps 112-1 through 112-N. The proxy 114 provides to any Internet resource (e.g., $R_M$ 130-M) with which it communicates, a UUID that is common to any and all of the apps 112-1 through 1120-N executing thereon. The UUID enables any of the Internet resources $R_1$ 130-1 through $R_M$ 130-M to uniquely identify the mobile device regardless of which of the apps made a request to the Internet resource.

It should be noted that in one embodiment, the user of the mobile device may be able to allow or disallow the participation of one or more of the apps 112-1 through 1120-N in the UUID scheme. In that way a user of the mobile device 110 can ensure that some but not all, of the apps 112-1 through 112-N allow the gathering of information respective of the user of the mobile device.

In one embodiment, the UUID may be provided by the proxy 114 as a hypertext transfer protocol (HTTP) header. However, this should not be viewed as a limitation thereto, and it may be provided by headers of other communication protocols as well as in other appropriate manners. Moreover, the header may further provide additional information including, but not limited to, the type of the mobile device, its operating system (OS), the app actually attempting to access the Internet resources, and more. The approach shown hereinabove is suitable, for example but not by way of limitation, to mobile devices using the Android® operating system.

In another embodiment, the UUID is provided by the local proxy 114 while each of the apps 112-1 through 112-N maintains its own UID. Accordingly, the local proxy 114 replaces the UID from each of the apps 112-1 through 112-N with a UUID, thereby ensuring that a single identification is provided to any Internet resource (e.g., $R_M$ 130-M) regardless of which of the apps 112-1 through 112-N is attempting to access the Internet resource 130-M. In another embodiment both the UUID and the UID can be provided to the Internet resource.

Figure 2:
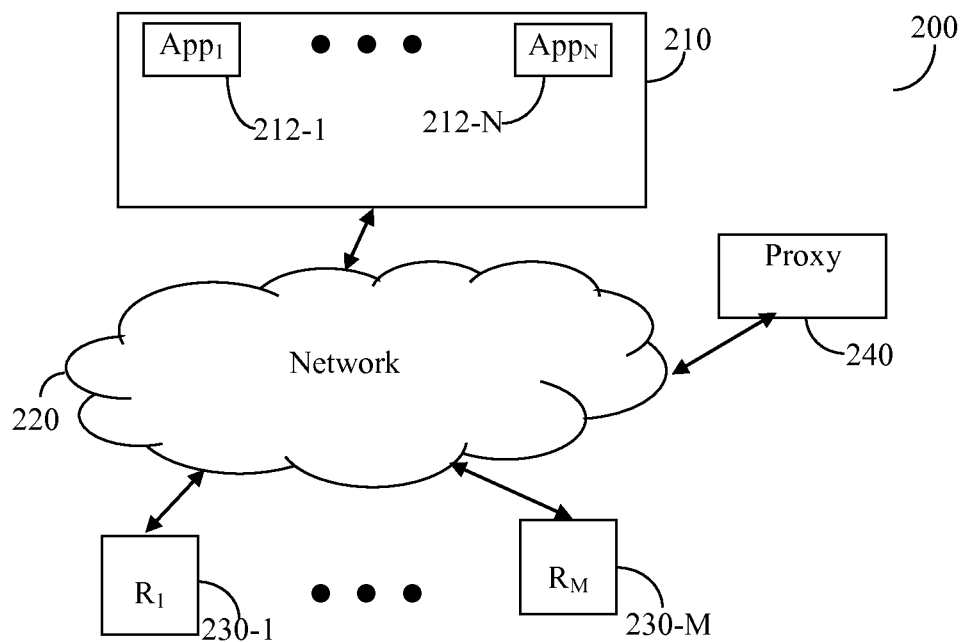
FIG. 2 is a schematic diagram of a system according to another embodiment disclosed herein.

FIG. 2 shows an exemplary and non-limiting schematic diagram of a system 200 according to another embodiment. A mobile device 210 equipped with a plurality of apps $APP_1$ 212-1 through $APP_N$ 212-N is communicatively connected to the network 220. The network 220 may be a local area network (LAN), a wide area network (WAN), a metro area network (MAN), the Internet, the worldwide web (WWW), a wireless network, a wired network, a cellular network, the like, and any combinations thereof.

Unlike the system described with respect of FIG. 1, in system 200 a proxy is not installed on the mobile device 210, which may be, for example and without limitation, one of the devices equipped with an iOS® type of operating system, such as Apple® iPhone® devices. In this instant embodiment, the apps $APP_1$ 212-1 through $APP_N$ 212-N are directed to communicate with the Internet resources $R_1$ 230-1 through $R_M$ 230-M through a proxy 240. The $APP_1$ 212-1 through $APP_N$ 212-N, Internet resources $R_1$ 230-1 through $R_M$ 230-M, and the proxy 240 are communicatively connected to the network 220.

The principle of the operation of the system 200 is the same as discussed with respect of FIG. 1, where a UUID is provided when each of the apps 212-1 through 212-N attempts to reach an Internet resource 230. The UUID may be provided by the proxy 240, as a hypertext transfer protocol (HTTP) header; however, this should not be viewed as a limitation thereto, and other headers, tokens, and other means of unique identification may be used to implement the UUID without limiting the scope of the invention. Moreover, a UUID, for example a header, may further provide additional information including, but not limited to, the type of the mobile device, its operating system (OS), the app actually attempting to access the Internet resources, and more.

In one embodiment, the proxy 240 is a computing device having a processor, a memory, and instructions thereto loaded in the memory such that when executed by the processor result in execution of the proxy functions described herein. While a single mobile device 210 is shown in FIG. 2 it should be understood that the proxy 240 may handle a plurality of mobile devices as may be necessary and befitting the proxy 240 capacity of effective handling.

Figure 3:
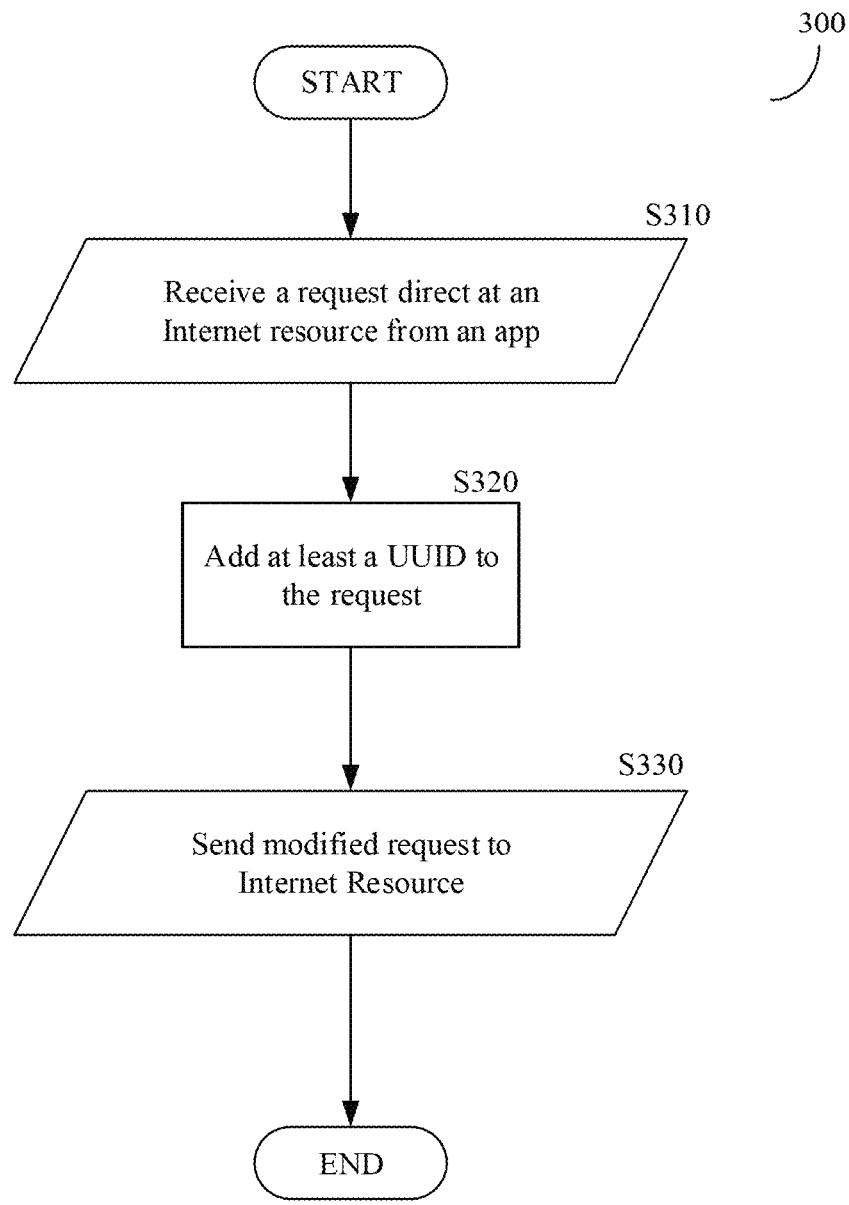
FIG. 3 is a flowchart describing the operation of the system according to one embodiment disclosed herein.

FIG. 3 depicts an exemplary and non-limiting flowchart 300 describing the operation of the system according to an embodiment. In S310, the proxy 114 or 240 receives a request to access an Internet resource by one of a plurality of apps 112 or 212 respectively, of a mobile device 110 or 210 respectively. In S320, the proxy, 114 or 240 as the case may be, adds to the request a header with the UUID for unique identification of the mobile device and/or the user of the mobile device. In S330, the request with the header containing the UUID is sent to the target Internet resource.

According to one embodiment, it is necessary to provide information respective of the app attempting to access an Internet resource. While in certain cases such identification is straightforward, such as in the case of Apple's iPhone mobile devices, such identification is different and more complicated for other mobile operating systems, for example in Android based mobile devices. In order to be able to provide such information to the Internet resource, there is made use of the fact that when a local proxy is provided as discussed with respect of FIG. 1, a socket is opened for the communication of the app with the Internet resource. The mobile device maintains information that identifies which app has opened which socket. Thereafter, when an access is made via a specific socket, the mobile device resource handling this association is checked and thereby the specific app generating the request to the Internet resource is identified, and such information can then be provided to the Internet resource, for example, as part of a header information.

The various embodiments disclosed herein can be implemented as hardware, firmware, software, or any combination thereof. Moreover, the software is preferably implemented as an application program tangibly embodied on a program storage unit or tangible computer readable medium consisting of parts, or of certain devices and/or a combination of devices. The application program may be uploaded to, and executed by, a machine comprising any suitable architecture. Preferably, the machine is implemented on a computer platform having hardware, such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. All or some of the servers maybe combined into one or more integrated servers. Furthermore, a non-transitory computer readable medium is any computer readable medium except for a transitory propagating signal. The display segments and mini-display segments may be shown on a display area that can be a browser or another other appropriate application, either generic or tailored for the purposes described in detail hereinabove.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A proxy, comprising:
   a first interface to any of a plurality of resources to which a mobile device having a plurality of mobile applications is communicatively connected via a network;
   a second interface to the plurality of mobile applications;
   a processor connected to the first interface and to the second interface; and
   a memory connected to the processor and loaded with instructions that, when executed by the processor, cause the processor to receive a request for a resource from one of the plurality of mobile applications on the mobile device, the request comprising an identifier of the requesting mobile application, assign a unique user identification (UUID) to the mobile device, remove the identifier of the requesting mobile application from the request, insert the UUID of the mobile device into the request, wherein the UUID enables the requested resource to uniquely identify the mobile device regardless of which of the plurality of mobile applications made a request to the resource, and forward the request with the inserted UUID to the requested resource.

2. The proxy of claim 1, wherein the insertion of the UUID comprises adding the UUID in a header.

3. The proxy of claim 2, wherein the header further contains at least one of:
   information respective of the mobile application making the request to the at least one resource, identification of an operating system of the mobile device, a user identification (UID) provided by the mobile application when attempting to access the at least one resource.

4. The proxy of claim 3, wherein information respective of the mobile application is provided by identifying a socket in the proxy used for communication by the mobile application attempting to communicate with the resource and checking an association between the socket and the mobile application as provided by the mobile device.

5. The proxy of claim 1, wherein the proxy is an integral part of the mobile device.

6. The proxy of claim 1, wherein the proxy is a computing device connected to the network and independent of the mobile device.

7. A method, comprising:
   receiving a request at a proxy to access a resource by a mobile application executing on a mobile device, the mobile device having a plurality of mobile applications, the request comprising an identifier of the requesting mobile application;
   generating a unique user identification (UUID) by the proxy to uniquely identify the mobile device, thereby the UUID enables the at least one resource to uniquely identify the mobile device regardless of which of the plurality of mobile applications made a request to the resource;
   removing, by the proxy, the identifier of the requesting mobile application from the request;
   inserting, by the proxy, the UUID into the request; and
   forwarding, by the proxy, the request with the inserted UUID to the resource.

8. The method of claim 7, comprising adding the UUID in a header to the request.

9. The method of claim 8, wherein the header further contains at least one of:
   a name of the mobile application making the request to the resource, identification of an operating system of the mobile device, a user identification (UID) provided by the mobile application when attempting to access an resource.

10. The method of claim 9, wherein the name of the mobile application is provided by:
    identifying a socket in the proxy used for communication by the mobile application attempting to communicate with the resource; and
    checking an association between the socket and the mobile application as provided by the mobile device.

11. The method of claim 7, wherein the method executes on the mobile device.

12. The method of claim 7, wherein the method executes on a computing device communicatively connected to the network.

13. A non-transitory computer readable medium having instructions therein that when executed by the processor performs the method of claim 7.

\* \* \* \* \*